United States Patent
Banal, Jr. et al.

(10) Patent No.: US 9,411,111 B2
(45) Date of Patent: Aug. 9, 2016

(54) PLUGGABLE OPTICAL CONNECTOR, LOCK AND RELEASE MECHANISM THEREFOR

(71) Applicant: SAE Magnetics (H.K.) Ltd., Hong Kong (HK)

(72) Inventors: Margarito P. Banal, Jr., Hong Kong (HK); Vincent Wai Hung, Hong Kong (HK); Francis Guillen Gamboa, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 14/564,136

(22) Filed: Dec. 9, 2014

(65) Prior Publication Data

US 2016/0161681 A1 Jun. 9, 2016

(51) Int. Cl.
*G02B 6/36* (2006.01)
*G02B 6/38* (2006.01)

(52) U.S. Cl.
CPC ............ *G02B 6/3893* (2013.01); *G02B 6/3821* (2013.01); *G02B 6/3825* (2013.01); *G02B 6/3885* (2013.01)

(58) Field of Classification Search
CPC .................................. G02B 6/36; G02B 6/38
USPC ..................................................... 385/76, 70
See application file for complete search history.

(56) References Cited

U.S. PATENT DOCUMENTS

| | | | | |
|---|---|---|---|---|
| 6,412,986 B1 * | 7/2002 | Ngo | ...................... | G02B 6/3825 385/53 |
| 6,644,868 B2 * | 11/2003 | De Marchi | ........... | G02B 6/3821 385/56 |
| 6,846,115 B1 * | 1/2005 | Shang | ................ | H01R 12/7076 385/92 |
| 7,255,490 B2 | 8/2007 | Zhang et al. | | |
| 7,309,250 B2 | 12/2007 | Reed et al. | | |
| 7,507,111 B2 * | 3/2009 | Togami | .............. | H01R 13/6275 385/88 |
| 8,545,252 B2 | 10/2013 | Wang et al. | | |
| 2001/0010741 A1 * | 8/2001 | Hizuka | ................ | G02B 6/3825 385/55 |
| 2002/0150344 A1 * | 10/2002 | Chiu | .................... | G02B 6/3825 385/53 |
| 2003/0012520 A1 * | 1/2003 | Rogge | ................. | G02B 6/3825 385/88 |
| 2003/0206403 A1 * | 11/2003 | Zaremba | .............. | G02B 6/4292 361/728 |
| 2003/0236019 A1 * | 12/2003 | Hanley | ................. | G02B 6/4292 439/372 |
| 2004/0033027 A1 * | 2/2004 | Pang | .................... | G02B 6/3825 385/53 |
| 2006/0027686 A1 * | 2/2006 | Taylor | .................... | B01L 3/502 241/2 |
| 2009/0046981 A1 * | 2/2009 | Margolin | ............. | G02B 6/3825 385/70 |
| 2010/0081303 A1 * | 4/2010 | Roth | .................... | G02B 6/3817 439/140 |
| 2014/0134898 A1 | 5/2014 | Wang et al. | | |
| 2014/0254993 A1 * | 9/2014 | Koutrokois | .......... | G02B 6/4261 385/92 |
| 2015/0038905 A1 * | 2/2015 | Andino | ................. | A61F 9/0017 604/117 |
| 2015/0370025 A1 * | 12/2015 | Wells | ..................... | G02B 6/444 385/135 |

* cited by examiner

*Primary Examiner* — Kaveh C Kianni

(57) ABSTRACT

A pluggable optical connector with a lock and release mechanism having a slider. The slider includes a handle, two spaced apart longitudinal arms extending from the handle and along two opposite sidewalls of a housing of the connector, two wedges formed at two free ends of the two arms respectively for forcing two deflectable locking tabs formed on a cage outwards when the connector is plugged into the cage and locked therein, and a bridge extending between the two arms. A single transverse leaf spring is positioned between the bridge and a transverse vertical wall extending inwardly from the housing of the connector. The leaf spring exerts spring force in a longitudinal direction, and locking of the connector is released with a reverse movement of the connector countering the spring force.

17 Claims, 13 Drawing Sheets

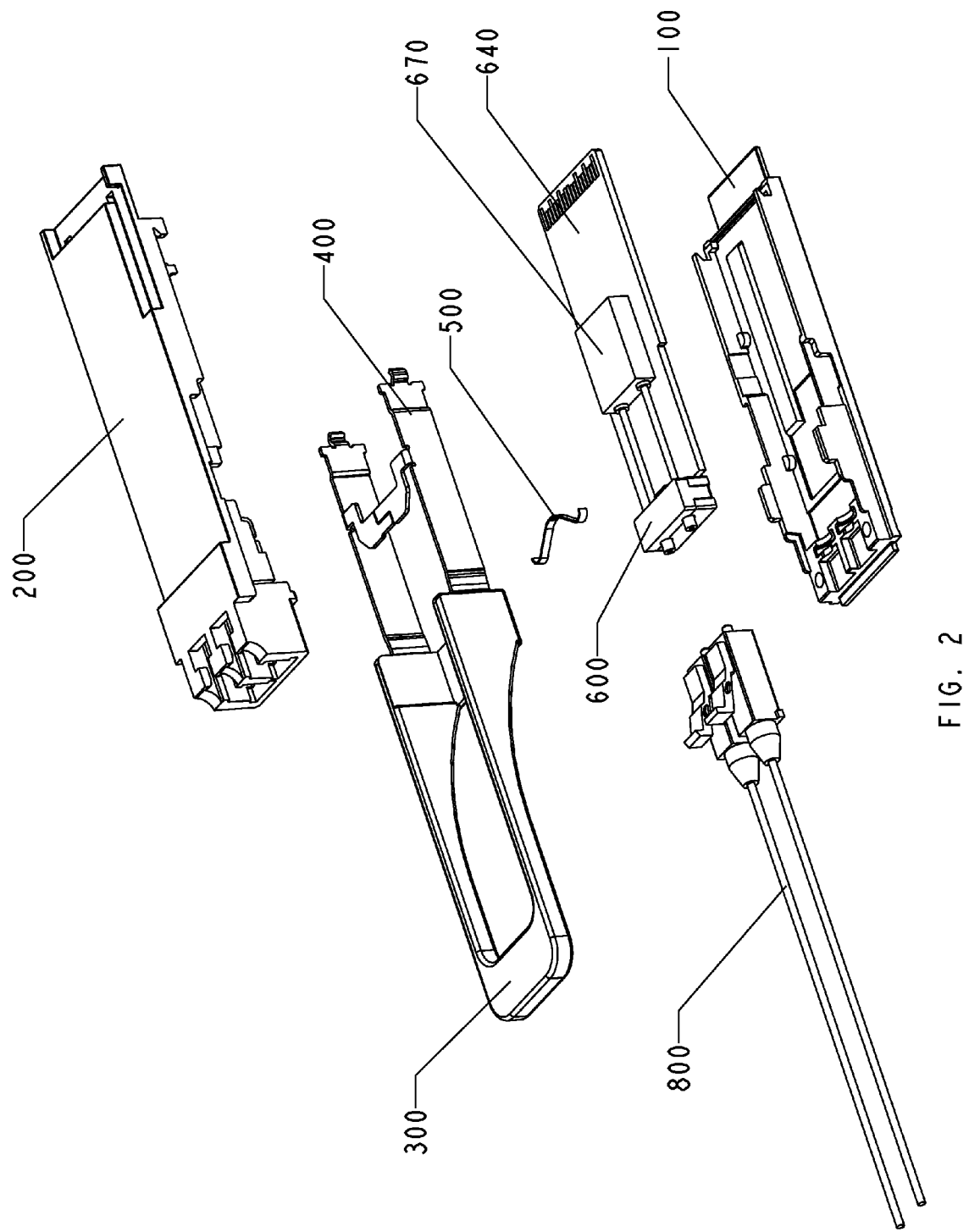

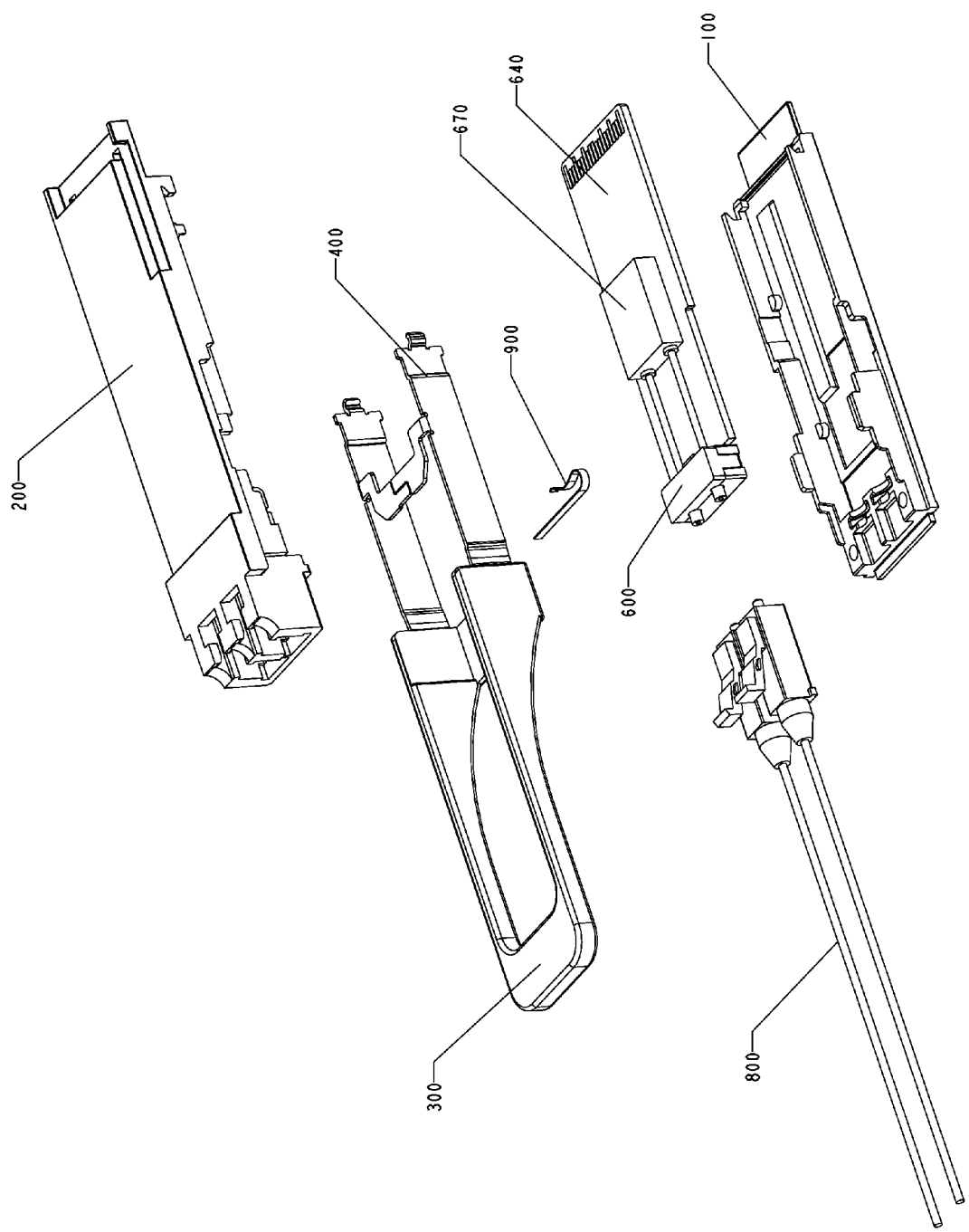

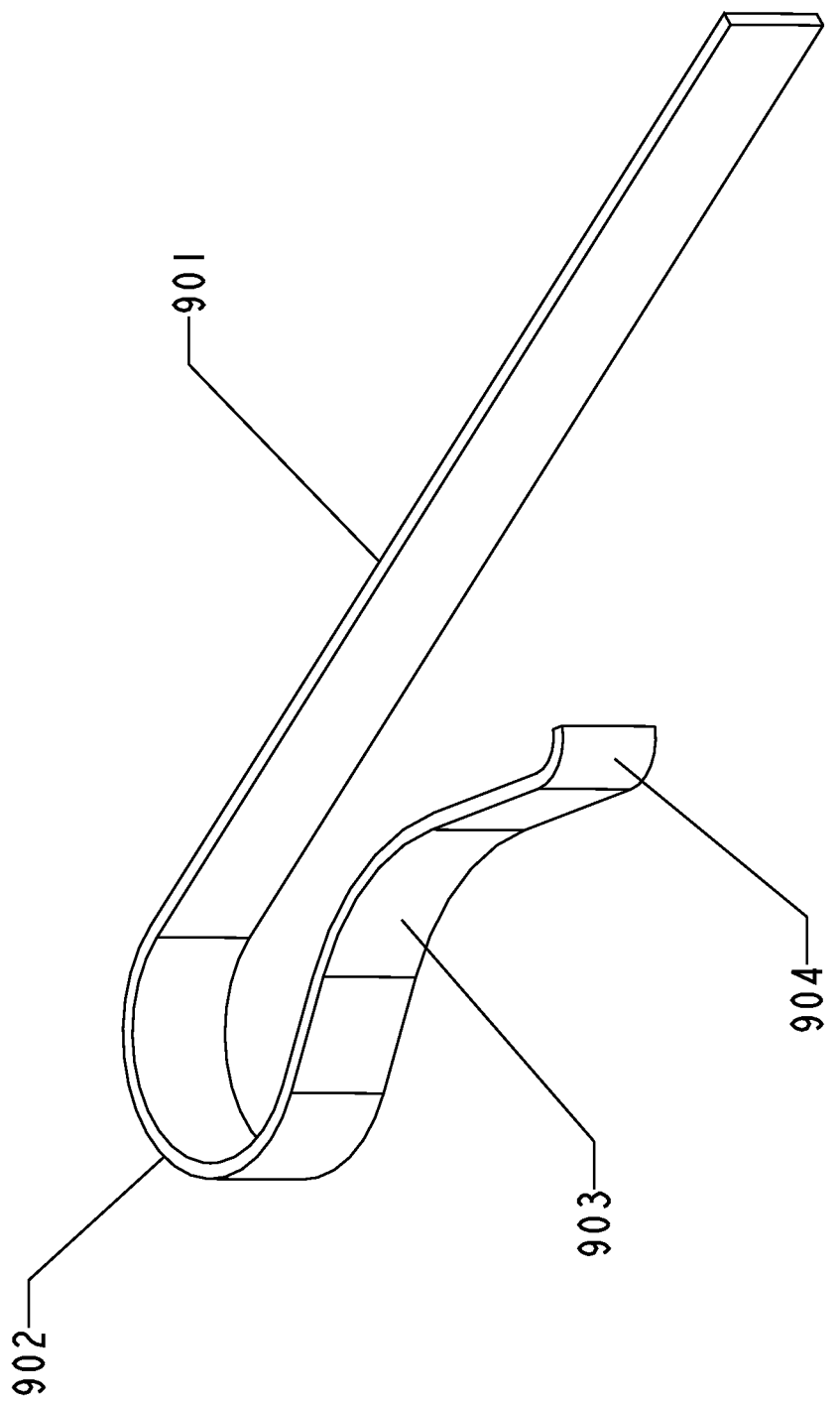

PLUGGABLE OPTICAL CONNECTOR, LOCK AND RELEASE MECHANISM THEREFOR

FIELD OF THE TECHNOLOGY

The present application relates to a pluggable optical connector, and a lock and release mechanism for a pluggable optical connector.

BACKGROUND

Electronic systems and communications have increased their applications in the recent years. There is also an increase in data transfer to improve the performance and the complexities in processing communication data. Optical connectors are used to transfer data signals for long or short distances between electronic peripherals or even more circuit connections. Higher data transfer rate is in demand for high speed optical signals to replace electrical connection to achieve the needed data transfer rate.

The mechanical integrity of assembly of this kind of electronic device is important as optical fiber is used for data transfer and higher data rate is required.

The above description of the background is provided to aid in understanding the pluggable optical connector, but is not admitted to describe or constitute pertinent prior art to the pluggable optical connector, or consider the cited documents as material to the patentability of the claims of the present application.

SUMMARY

According to one aspect, there is provided a pluggable optical connector including (a) a two-part housing having a top housing part and a bottom housing part; (b) a slider having a handle, two spaced apart longitudinal arms extending from the handle and along two opposite sidewalls of the housing respectively, two wedges formed at two free ends of the two arms respectively for forcing two deflectable locking tabs formed on a cage outwards when the connector is plugged into the cage and locked therein, and a bridge connected to and extending between the two arms; and (c) a single transverse leaf spring positioned between the bridge and a transverse vertical wall extending inwardly from the top housing part. The leaf spring may be made of metal and can exert spring force against the bridge and the vertical wall in a longitudinal direction, whereby locking of the connector can be released with a reverse movement of the connector countering the spring force of the leaf spring.

In one embodiment, the leaf spring can be positioned in a space defined by the bridge, the vertical wall, the top housing part from which the vertical wall extends, and a cap provided on the bottom housing part.

In one embodiment, the bridge may include a first wing portion extending inwardly from one arm and a second wing portion extending inwardly from the other arm, and wherein free ends of the two wing portions can be connected to each other at midway of the bridge. The free ends of the two wing portions can be in the form of two interlocking tabs. A cutout may be formed at a middle portion of the bridge to receive therein a middle convex portion of the leaf spring to thereby prevent transverse movement thereof.

In one embodiment, the leaf spring can be in the form of a strip having a middle convex portion pressing against the bridge, and two legs extending in opposite directions from the middle convex portion and having two convexly curved end portions pressing against the vertical wall. The leaf spring may further include two extended convexly curved portions extending from the two convexly curved end portions respectively for pressing against the two opposite sidewalls of the housing when the leaf spring is pressed and transversely extends.

In another embodiment, the leaf spring can be in a form of a J-shaped spring member having a transverse elongate portion pressing against the transverse vertical wall, a semi-circular convex portion extending from one end of the elongate portion and pressing against one of the two opposite sidewalls of the housing, and a middle convex portion extending from the semi-circular convex portion and pressing against the bridge at a middle portion thereof.

In one embodiment, a lower edge of the leaf spring may be positioned on a top surface of a cap which is mounted on a receptacle support for supporting two optical receptacle modules, and wherein the two optical receptacle modules can be connected respectively to two optical fibers extending from an optical module mounted on a printed circuit board subassembly.

According to another aspect, there is provided a lock and release mechanism for a pluggable optical connector. The lock and release mechanism may include (a) a slider having a handle, two spaced apart longitudinal arms extending from the handle and along two opposite sidewalls of a housing of the connector, two wedges formed at two free ends of the two arms respectively for forcing two deflectable locking tabs formed on a cage outwards when the connector is plugged into the cage and locked therein, and a bridge connected to and extending between the two arms; and (b) a single transverse leaf spring positioned between the bridge and a transverse vertical wall extending inwardly from the housing of the connector. The leaf spring can exert spring force against the bridge and the vertical wall in a longitudinal direction, whereby locking of the connector can be released with a reverse movement of the connector countering the spring force of the leaf spring. The housing of the connector can be a two-part housing having a top housing part and a bottom housing part.

In one embodiment, the leaf spring can be positioned in a space defined by the bridge, the vertical wall, the top housing part from which the vertical wall extends, and a cap provided on the bottom housing part.

In one embodiment, the bridge may be formed by a first wing portion extending inwardly from one arm and a second wing portion extending inwardly from the other arm, and wherein free ends of the two wing portions can be connected to each other at midway of the bridge. The free ends of the two wing portions can be in the form of two interlocking tabs. A cutout may be formed at a middle portion of the bridge to receive therein a middle convex portion of the leaf spring to thereby prevent transverse movement thereof.

In one embodiment, the leaf spring can be in the form of a strip having a middle convex portion pressing against the bridge, and two legs extending in opposite directions from the middle convex portion and having two convexly curved end portions pressing against the vertical wall. The leaf spring may further include two extended convexly curved portions extending from the two convexly curved end portions respectively for pressing against the two opposite sidewalls of the housing when the leaf spring is pressed and transversely extends.

In another embodiment, the leaf spring can be in the form of a J-shaped spring member having a transverse elongate portion pressing against the transverse vertical wall, a semi-circular convex portion extending from one end of the elongate portion and pressing against one of the two opposite sidewalls of the housing, and a middle convex portion extending from the semi-circular convex portion and pressing against the bridge at a middle portion thereof.

In one embodiment, a lower edge of the leaf spring may be positioned on a top surface of a cap which is mounted on a receptacle support for supporting an optical receptacle module, and wherein the optical receptacle module is connected to an optical fiber extending from an optical module mounted on a printed circuit board sub-assembly.

Although the pluggable optical connector is shown and described with respect to certain embodiments, it is obvious that equivalents and modifications will occur to others skilled in the art upon the reading and understanding of the specification. The pluggable optical connector in the present application includes all such equivalents and modifications, and is limited only by the scope of the claims.

BRIEF DESCRIPTION OF THE DRAWINGS

Specific embodiments of the pluggable optical connector will now be described by way of example with reference to the accompanying drawings wherein:

FIG. 2 is an exploded view of the optical connector shown in FIG. 1.

FIG. 2a is an exploded view of the optical connector shown in FIG. 1, showing another embodiment of a leaf spring.

FIG. 3a is a bottom perspective view of a top housing part with the transverse leaf spring shown in FIG. 2a.

FIG. 4a is an enlarged perspective view of the leaf spring shown in FIG. 2a.

DETAILED DESCRIPTION

Figure 1:
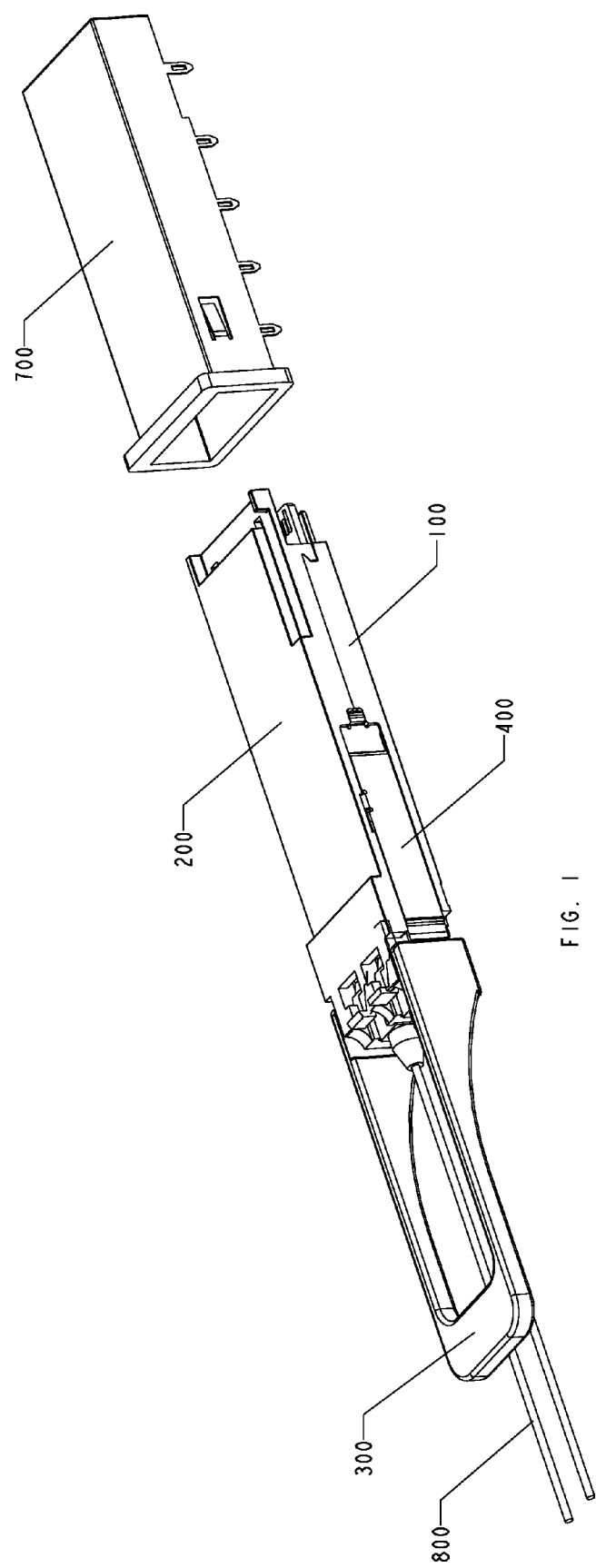
FIG. 1 is a perspective view of a pluggable optical connector according to an embodiment thereof.

Reference will now be made in detail to a preferred embodiment of the pluggable optical connector, examples of which are also provided in the following description. Exemplary embodiments of the pluggable optical connector are described in detail, although it will be apparent to those skilled in the relevant art that some features that are not particularly important to an understanding of the pluggable optical connector may not be shown for the sake of clarity.

Furthermore, it should be understood that the pluggable optical connector is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms "upper", "lower", "vertical", "horizontal", "top", "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

FIG. 1 is a perspective view of a pluggable optical connector with a lock and release mechanism according to an embodiment thereof. The lock and release mechanism of the pluggable optical connector may include a bottom housing part 100, a top housing part 200, a handle 300, and a slider 400. The optical connector can be pluggable into a cage 700. The cage 700 may be permanently mounted on a printed circuit board. The bottom housing part 100 and the top housing part 200 together may form a two-part housing of the optical connector. Optical cables 800 can be attached to the optical connector. The slider 400 and the handle 300 may be attached to each other as over molded parts.

The slider 400 and the handle 300 can only travel longitudinally forwards in a plug-in direction or backwards within guiding slots formed at opposite sides of the optical connector, as it is pulled by a user or it is pushed by the leaf spring 500 inside the optical connector.

Although it is shown and described that the pluggable connector is pluggable optical connector, it is understood that the pluggable connector can be any pluggable electronic connectors with the lock and release mechanism disclosed herein.

FIG. 2 is an exploded view of the optical connector shown in FIG. 1. The optical connector includes a single transverse leaf spring 500 which may be positioned on a support or cap 600. An optical module 670 may be mounted on a printed circuit board (PCB) sub-assembly 640. The PCB sub-assembly 640 can be mounted on the bottom housing part 100. As used herein, the term "leaf spring" means a spring member made of a flat piece of metal.

Figure 3:
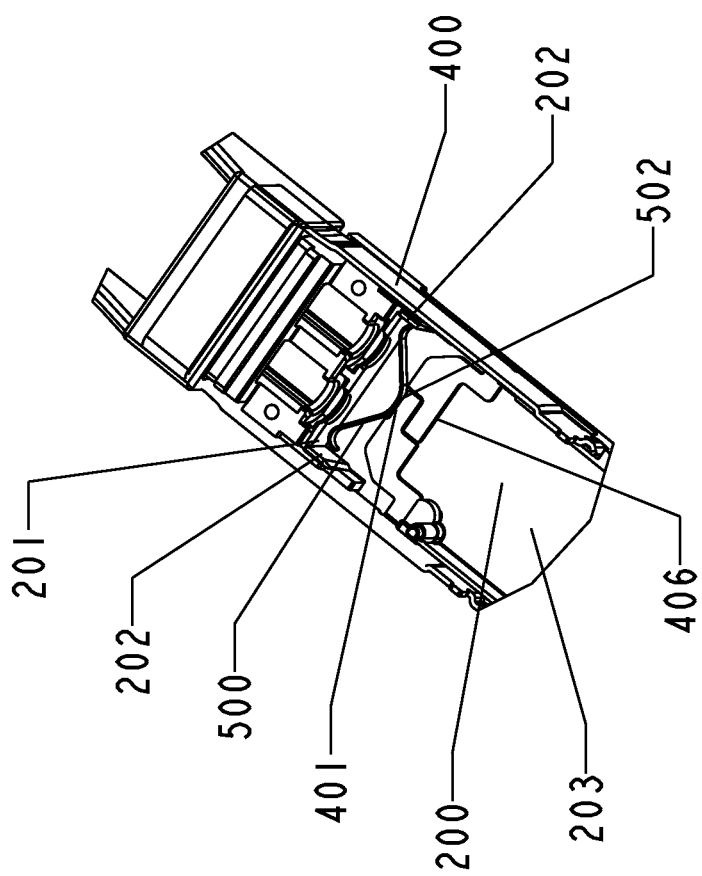
FIG. 3 is a bottom perspective view of a top housing part with a single transverse leaf spring.

FIG. 3 is a bottom perspective view of the top housing part 200 with the single transverse leaf spring 500 provided thereon. The single transverse leaf spring 500 can be positioned transversely between the bridge 406 and a transverse vertical wall 201 extending inwardly from the top housing part 200 and facing the bridge 406.

The leaf spring 500 can exert spring force against the bridge 406 and the vertical wall 201 in a longitudinal direction. The locking of the optical connector can be released with a reverse movement of the optical connector countering the spring force of the leaf spring 500.

Figure 4:
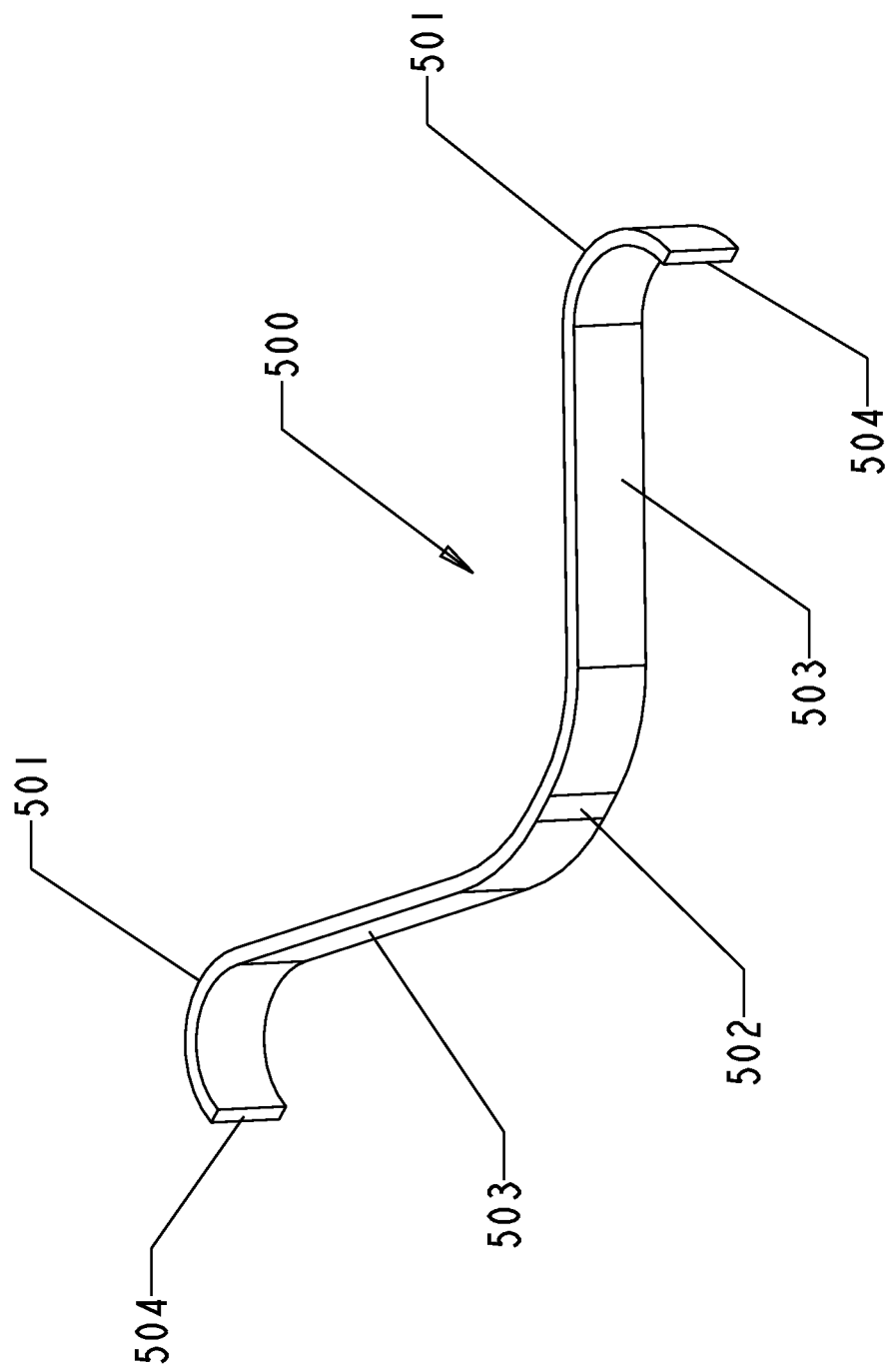
FIG. 4 is a perspective view of the transverse leaf spring according to an embodiment thereof.

FIG. 4 is a perspective view of the transverse leaf spring 500 according to an embodiment thereof. The leaf spring 500 may be in the form of a strip having a middle convex portion 502 pressing against the bridge 406, and two legs 503 extending in opposite directions from the middle convex portion 502 and having two convexly curved end portions 501 pressing against the vertical wall 201 of the top housing part 200. The leaf spring 500 may be made of metal or any other suitable material.

The leaf spring 500 may further include two extended convexly curved portions 504 extending from the two convexly curved end portions 501 respectively for pressing against two opposite sidewalls 202 of the top housing part 200 when the leaf spring 500 is pressed and transversely extends.

The two extended convexly curved portions 504 can be used to further increase the spring force of the leaf spring 500. When a user pulls the handle 300 further backwards opposite to the plug-in direction, the legs 503 of the leaf spring 500 spread or flatten and extend transversely until the two extended convexly curved portions 504 are in contact with the sidewalls 202 of the top housing part 200. The two extended convexly curved portions 504 compress and perform its spring action, and then release or expand after release of the handle 300.

Figure 3A:
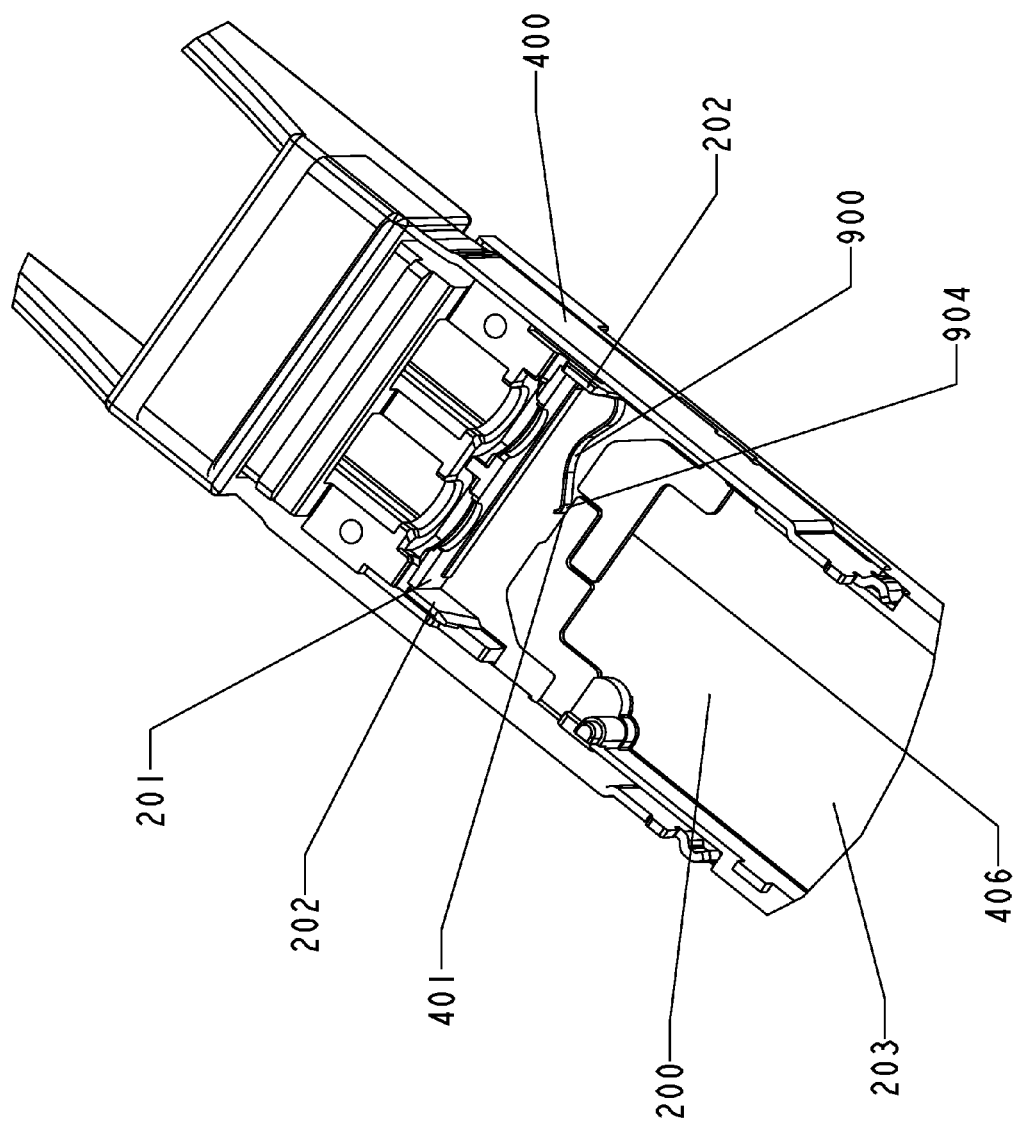

Although one embodiment of the leaf spring 500 has been shown and described, it is understood by one skilled in the art that the leaf spring 500 can be in any other possible shape and configuration so long as it can perform the functions described herein. Another embodiment of the leaf spring 500 is shown in FIGS. 2a, 3a and 4a FIG. 2a is an exploded view of the optical connector of FIG. 1, showing a second embodiment of the leaf spring. A single generally J-shaped transverse leaf spring 900 may be positioned on the support or cap 600. Similarly, the optical module 670 may be mounted on the printed circuit board (PCB) sub-assembly 640. The PCB sub-assembly 640 can be mounted on the bottom housing part 100.

FIG. 3a is a bottom perspective view of the top housing part 200 with the single transverse leaf spring 900 provided thereon. The single transverse leaf spring 900 can be positioned between the bridge 406 and the transverse vertical wall 201 extending inwardly from the top housing part 200 and facing the bridge 406.

The leaf spring 900 can exert spring force against the bridge 406 and the vertical wall 201 in a longitudinal direction. The locking of the optical connector can be released with a reverse movement of the optical connector countering the spring force of the leaf spring 900.

FIG. 4a is a perspective view of the leaf spring 900. The leaf spring 900 may be in the form of a J-shaped spring member having a transverse elongate portion 901 pressing against the transverse vertical wall 201, a semi-circular convex portion 902 extending from one end of the elongate portion 901 and pressing against one of the two opposite sidewalls 202 of the housing, and a middle convex portion 904 extending from the semi-circular convex portion 902 and pressing against the bridge 406 at a middle portion thereof. A concave portion 903 may be formed between the semi-circular convex portion 902 and the middle convex portion 904. The semi-circular convex portion 902 can generate a spring action, and then release or expand after release of the handle 300.

The J-shaped spring member 900 can be assembled in either direction as long as the transverse elongate portion 902 with a longer length is in contact with the transverse vertical wall 201 of the housing. In other words, when assembled, the semi-circular convex portion 902 can be pressing against one of the two opposite sidewalls 202 of the housing and facing one direction, or the semi-circular convex portion 902 can be pressing against the other one of the two opposite sidewalls 202 of the housing and facing the other direction.

Figure 5:
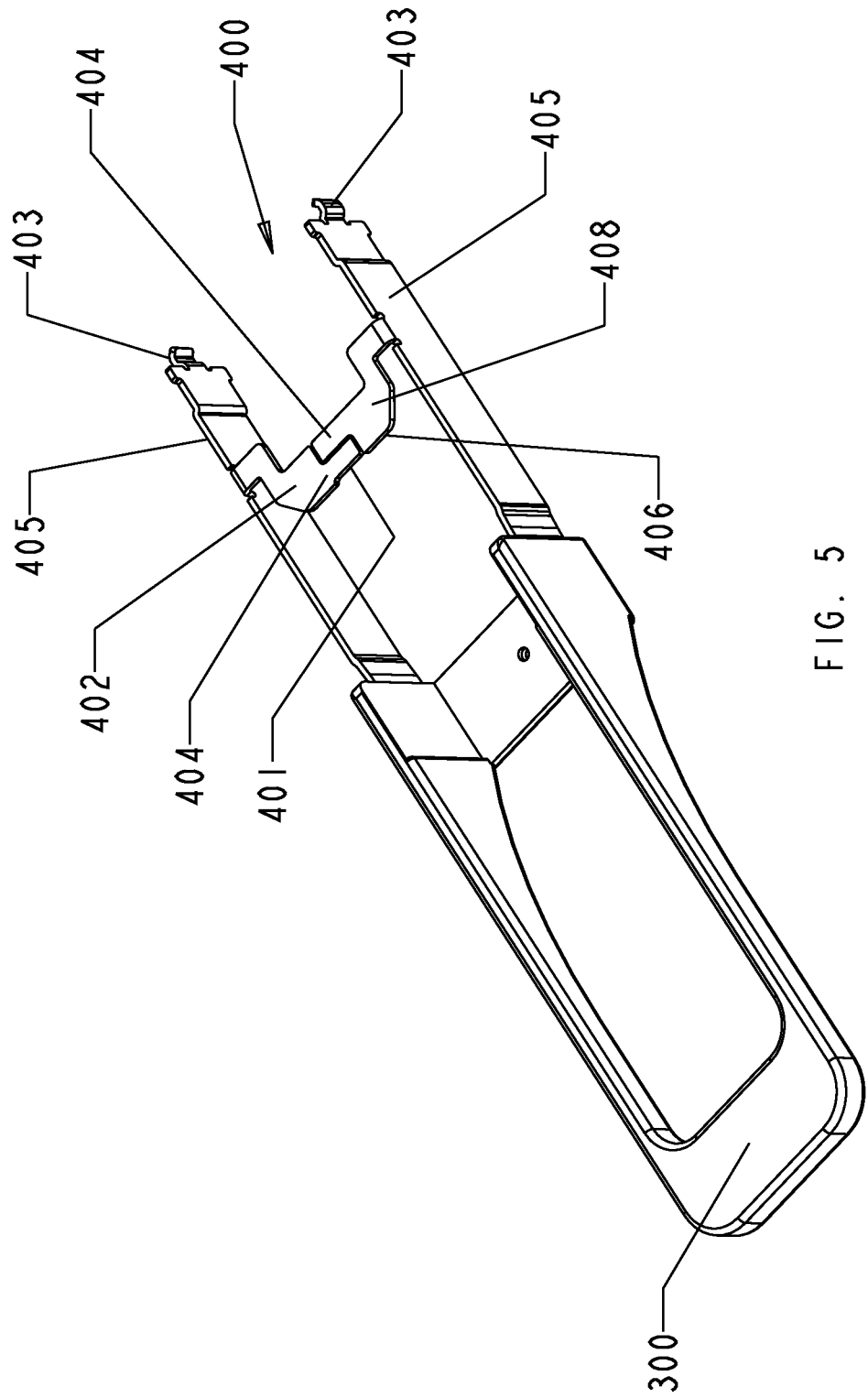
FIG. 5 is a perspective view of a slider of the optical connector according to an embodiment thereof.

FIG. 5 is a perspective view of the slider 400 of the optical connector according to an embodiment thereof. The handle 300 can be connected to an outer end of the slider 400. The slider 400 may include two spaced part longitudinal arms 405 extending from the handle 300 and along two opposite sidewalls 202 of the top housing part 200.

Two wedges 403 may be formed at two free ends of the two arms 405 respectively for forcing two deflectable tabs 701 (FIG. 7) formed on the cage 700 outwards when the optical connector is plugged into the cage 700 and then locked therein. A bridge 406 may be connected to and extending between the two arms 405. The slider 400 may be made of metal or any other suitable material.

The bridge 406 may be formed by a first wing portion 402 extending inwardly from one arm 405 and a second wing portion 408 extending inwardly from the other arm 405. The ends of the two wing portions 402, 408 can interlock each other at midway of the bridge 406.

In the illustrated embodiment, the free ends of the two wing portions 402, 408 may include two tabs 404 interlocking with each other to make the bridge 406 stronger.

A cutout 401 may be formed at a middle portion of the bridge 406 to receive therein the middle convex portion 502 of the leaf spring 500 to thereby prevent transverse movement thereof, as illustrated in FIG. 3.

Figure 6:
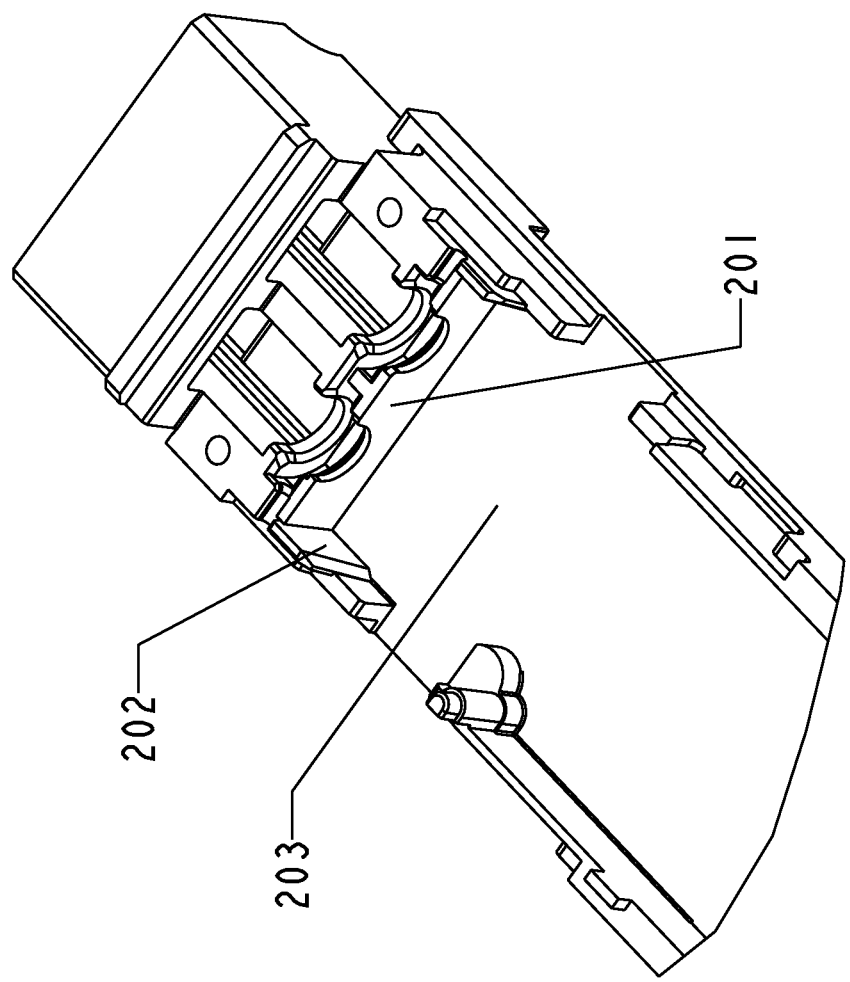
FIG. 6 is a bottom perspective view of the top housing part showing a vertical wall and sidewalls of the top housing part.

FIG. 6 is a bottom perspective view of the top housing part 200 showing the vertical wall 201, the sidewall 202 and an inner surface 203 of the top housing part 200 with the slider 400 and the leaf spring 500 being removed therefrom.

Figure 7:
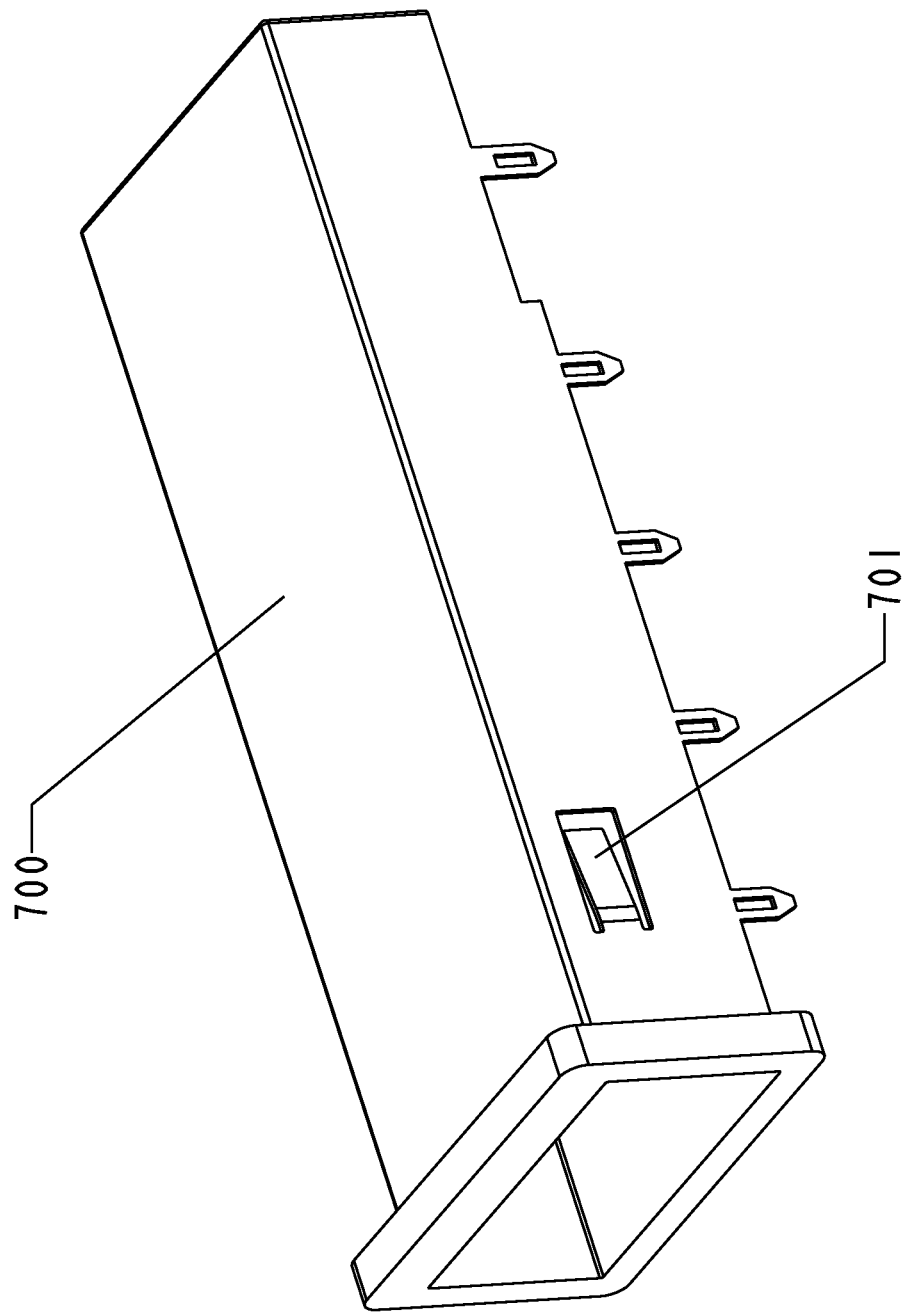
FIG. 7 is an enlarged perspective view of the cage according to an embodiment thereof.

FIG. 7 is an enlarged perspective view of the cage 700 according to an embodiment thereof. The two deflectable tabs 701 can be formed on two opposite sidewalls of the cage 700 respectively.

Figure 8:
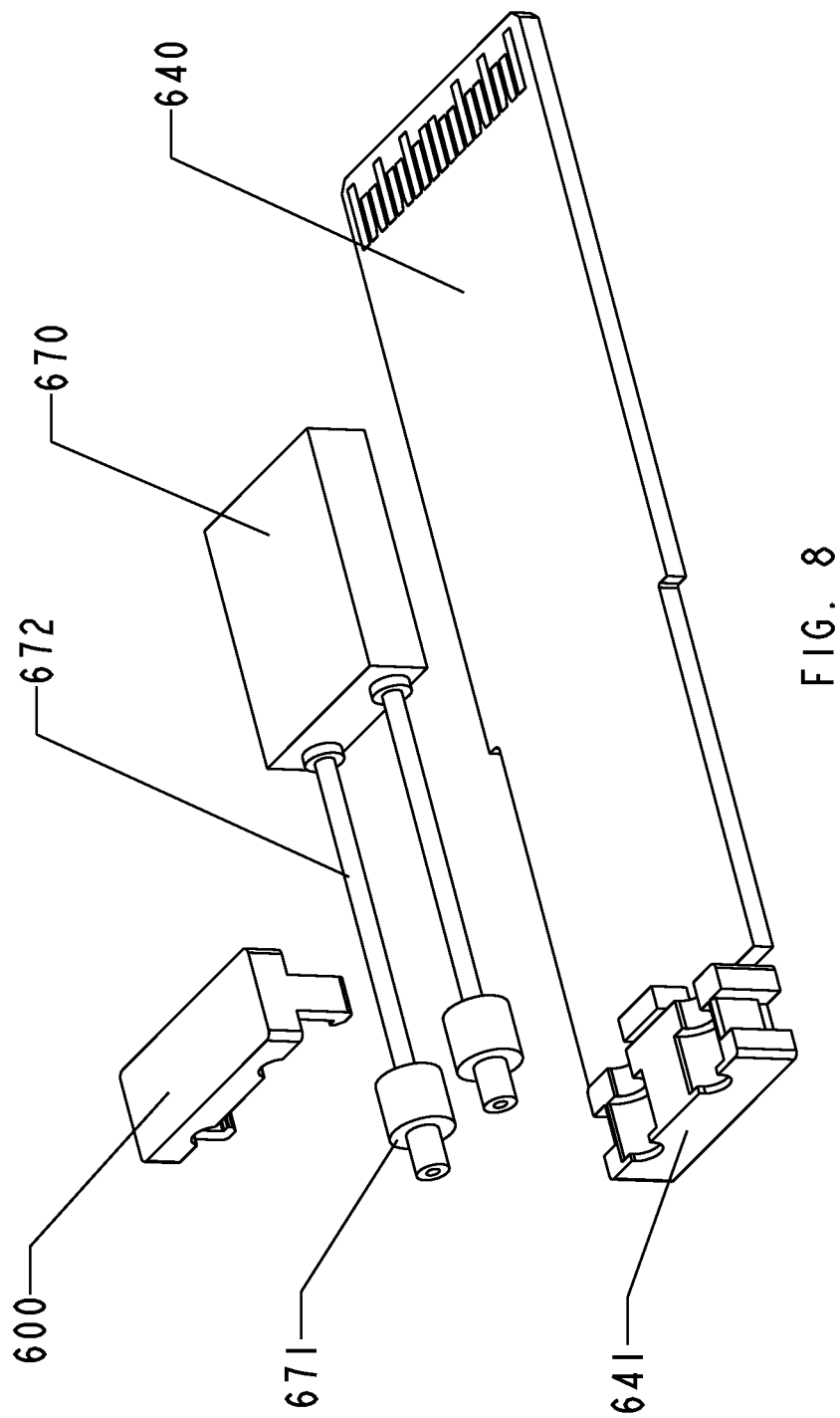
FIG. 8 is an exploded view of an optical module assembly according to an embodiment thereof.
Figure 9:
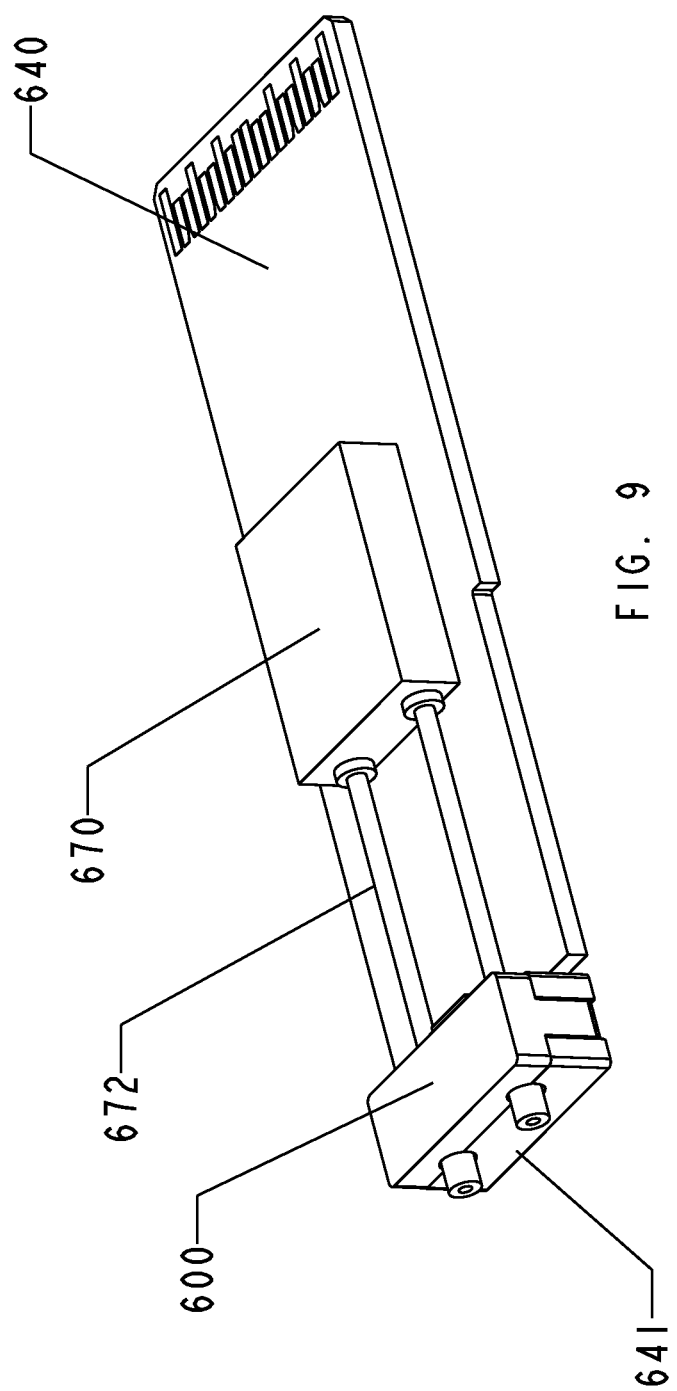
FIG. 9 is a perspective view of the optical module assembly shown in FIG. 8.

FIG. 8 is an exploded view of an optical module assembly according to an embodiment thereof, and FIG. 9 is a perspective view of the optical module assembly shown in FIG. 8. The cap 600 may be mounted on a receptacle support 641 to form an enclosure for supporting an optical receptacle module 671 therein. The optical receptacle module 671 can be connected to an optical fiber 672 extending from an optical module 670, such as Transmitter and Receiver devices, mounted on a printed circuit board (PCB) sub-assembly 640. This assembling arrangement can prevent any assembly issue such as broken optical parts that may affect the overall performance of the optical connector.

In the illustrated embodiment, the cap 600 is snap-fitted on a receptacle support 641 for supporting two optical receptacle modules 671. The two optical receptacle modules 671 are connected respectively to two optical fibers 672 extending from the optical module 670.

Figure 10:
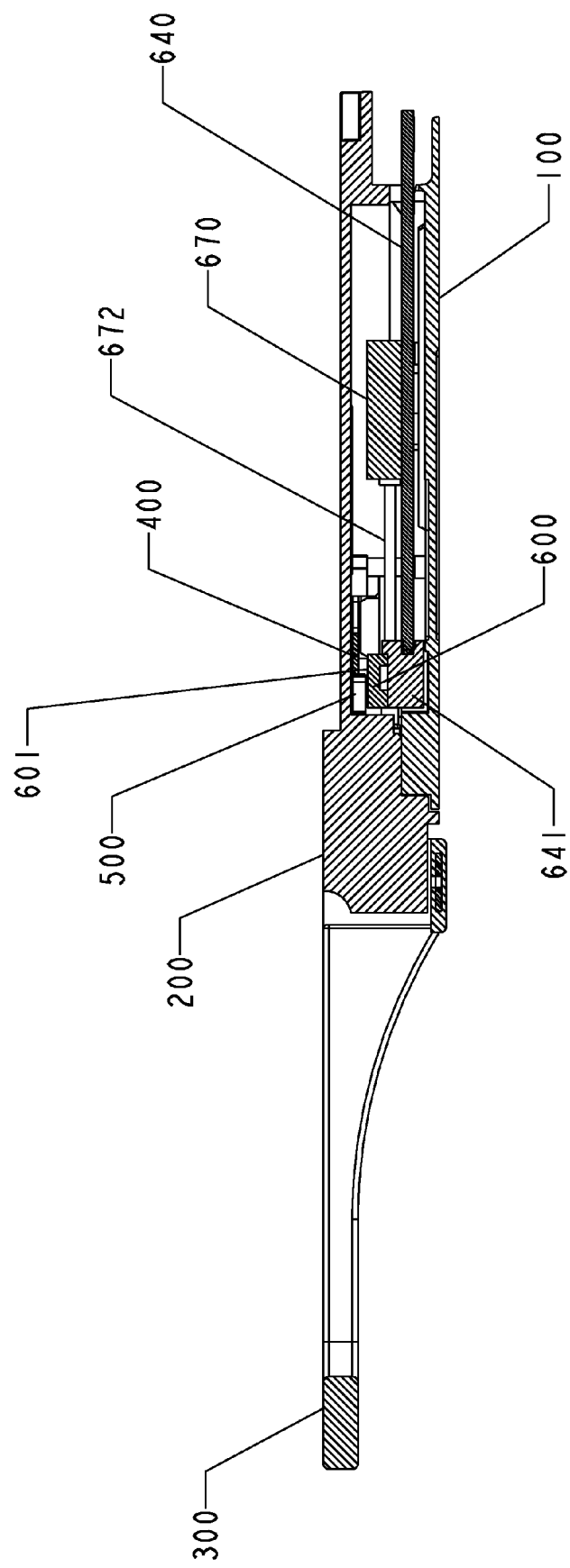
FIG. 10 is a cross sectional view of the optical connector.

FIG. 10 is a cross sectional view of the pluggable optical connector. The top and bottom housing parts 200, 100 can be tightly connected by two screws or any other suitable fastening means after all the components of the optical connector are assembled together. It can be seen that the leaf spring 500 can be positioned in a space defined by the bridge 406, the vertical wall 201, the top housing part 200 from which the vertical wall 201 extends, and the cap 600 provided on the bottom housing part 100.

It is appreciated that the leaf spring 500 may have tendency to move vertically up or down during release action. However, its vertical movement can be prevented by the inner surface 203 of the top housing part 200 and the top surface of the cap 600. These surfaces can limit vertical movement of the leaf spring 500 and help to maintain constant and reliable spring force during release action. The cap 600 is also useful to prevent the leaf spring 500 from coming out from its desired position.

The space inside the existing pluggable connector with two compression springs is not enough when more electronic components are added to achieve the required functions. The single leaf spring 500 can replace the traditional two compression springs and can maintain the function of the release mechanism of the connector.

The use of the single leaf spring 500 can reduce one part assembly in the process of assembling the connector. The assembling of a single leaf spring is quicker and easier than assembling the traditional two compression springs. Furthermore, the single leaf spring 500 requires a shorter vertical space than two compression springs. The single leaf spring 500 is smaller in size than that of two compression springs, and yet it can perform the same function as two compression springs. The spring force at each side of the single leaf spring 500 is more balance than the spring force of two separate compression springs.

While the pluggable optical connector has been shown and described with particular references to a number of preferred embodiments thereof, it should be noted that various other changes or modifications may be made without departing from the scope of the appended claims.

What is claimed is:

1. A pluggable optical connector comprising:
   a two-part housing having a top housing part and a bottom housing part;
   a slider comprising a handle, two spaced apart longitudinal arms extending from the handle and along two opposite sidewalls of the housing respectively, two wedges formed at two free ends of the two arms respectively for forcing two deflectable locking tabs formed on a cage outwards when the connector is plugged into the cage and locked therein, and a bridge connected to and extending between the two arms; and
   a single transverse leaf spring positioned between the bridge and a transverse vertical wall extending inwardly from the top housing part;
   wherein the leaf spring exerts spring force against the bridge and the vertical wall in a longitudinal direction, and locking of the connector is released with a reverse movement of the connector countering the spring force of the leaf spring; and
   the leaf spring is positioned in a space defined by the bridge, the vertical wall, the top housing part from which the vertical wall extends, and a cap provided on the bottom housing part.

2. The pluggable optical connector as claimed in claim 1, wherein the bridge comprises a first wing portion extending inwardly from one arm and a second wing portion extending inwardly from the other arm, and wherein free ends of the two wing portions connected to each other at midway of the bridge.

3. The pluggable optical connector as claimed in claim 2, wherein the free ends of the two wing portions are in the form of two interlocking tabs.

4. The pluggable optical connector as claimed in claim 1, wherein a cutout is formed at a middle portion of the bridge to receive therein a middle convex portion of the leaf spring to thereby prevent transverse movement thereof.

5. The pluggable optical connector as claimed in claim 1, wherein the leaf spring is in the form of a strip comprising a middle convex portion pressing against the bridge, and two legs extending in opposite directions from the middle convex portion and having two convexly curved end portions pressing against the vertical wall.

6. The pluggable optical connector as claimed in claim 5, further comprising two extended convexly curved portions extending from the two convexly curved end portions respectively for pressing against the two opposite sidewalls of the housing when the leaf spring is pressed and transversely extends.

7. The pluggable optical connector as claimed in claim 1, wherein the leaf spring is in a form of a J-shaped spring member comprising a transverse elongate portion pressing against the transverse vertical wall, a semi-circular convex portion extending from one end of the elongate portion and pressing against one of the two opposite sidewalls of the housing, and a middle convex portion extending from the semi-circular convex portion and pressing against the bridge at a middle portion thereof.

8. The pluggable optical connector as claimed in claim 1, wherein a lower edge of the leaf spring is positioned on a top surface of a cap which is mounted on a receptacle support for supporting two optical receptacle modules, and wherein the two optical receptacle modules are connected respectively to two optical fibers extending from an optical module mounted on a printed circuit board sub-assembly.

9. The pluggable optical connector as claimed in claim 1, wherein the leaf spring is made of metal.

10. A lock and release mechanism for a pluggable optical connector, the lock and release mechanism comprising:
    a slider comprising a handle, two spaced apart longitudinal arms extending from the handle and along two opposite sidewalls of a housing of the connector, two wedges formed at two free ends of the two arms respectively for forcing two deflectable locking tabs formed on a cage outwards when the connector is plugged into the cage and locked therein, and a bridge connected to and extending between the two arms; and
    a single transverse leaf spring positioned between the bridge and a transverse vertical wall extending inwardly from the housing of the connector;
    wherein the leaf spring exerts spring force against the bridge and the vertical wall in a longitudinal direction, and locking of the connector is released with a reverse movement of the connector countering the spring force of the leaf spring;
    the housing of the connector is a two-part housing having a top housing part and a bottom housing part; and
    the leaf spring is positioned in a space defined by the bridge, the vertical wall, the top housing part from which the vertical wall extends, and a cap provided on the bottom housing part.

11. The lock and release mechanism as claimed in claim 10, wherein the bridge is formed by a first wing portion extending inwardly from one arm and a second wing portion extending inwardly from the other arm, and wherein free ends of the two wing portions connected to each other at midway of the bridge.

12. The lock and release mechanism as claimed in claim 11, wherein the free ends of the two wing portions are in the form of two interlocking tabs.

13. The lock and release mechanism as claimed in claim 10, wherein a cutout is formed at a middle portion of the bridge to receive therein a middle convex portion of the leaf spring to thereby prevent transverse movement thereof.

14. The lock and release mechanism as claimed in claim 10, wherein the leaf spring is in the form of a strip comprising a middle convex portion pressing against the bridge, and two legs extending in opposite directions from the middle convex portion and having two convexly curved end portions pressing against the vertical wall.

15. The lock and release mechanism as claimed in claim 14, further comprising two extended convexly curved portions extending from the two convexly curved end portions respectively for pressing against the two opposite sidewalls of the housing when the leaf spring is pressed and transversely extends.

16. The lock and release mechanism as claimed in claim 10, wherein the leaf spring is in the form of a J-shaped spring member comprising a transverse elongate portion pressing against the transverse vertical wall, a semi-circular convex portion extending from one end of the elongate portion and pressing against one of the two opposite sidewalls of the housing, and a middle convex portion extending from the semi-circular convex portion and pressing against the bridge at a middle portion thereof.

17. The lock and release mechanism as claimed in claim 10, wherein a lower edge of the leaf spring is positioned on a top surface of a cap which is mounted on a receptacle support for supporting an optical receptacle module, and wherein the optical receptacle module is connected to an optical fiber extending from an optical module mounted on a printed circuit board sub-assembly.

* * * * *